No 799,238. PATENTED SEPT. 12, 1905.
S. F. JONES.
SEXTUPLEX TELEGRAPHY.
APPLICATION FILED APR. 7, 1905.
2 SHEETS—SHEET 1.
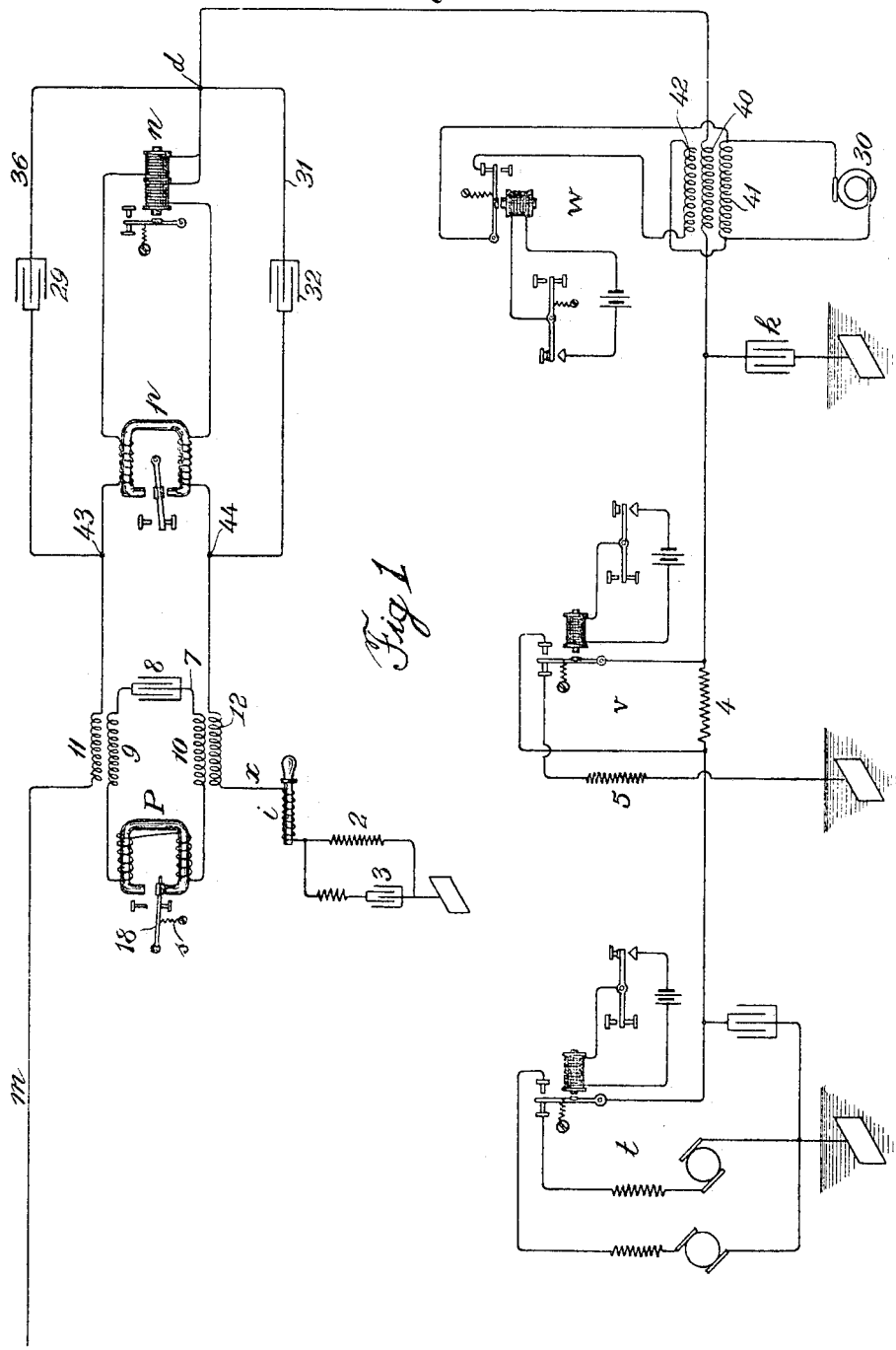
Witnesses
A. M. Donlevy.
H. Weichsel.
Inventor
Sterns F. Jones
By his Attorney W. B. Vansize

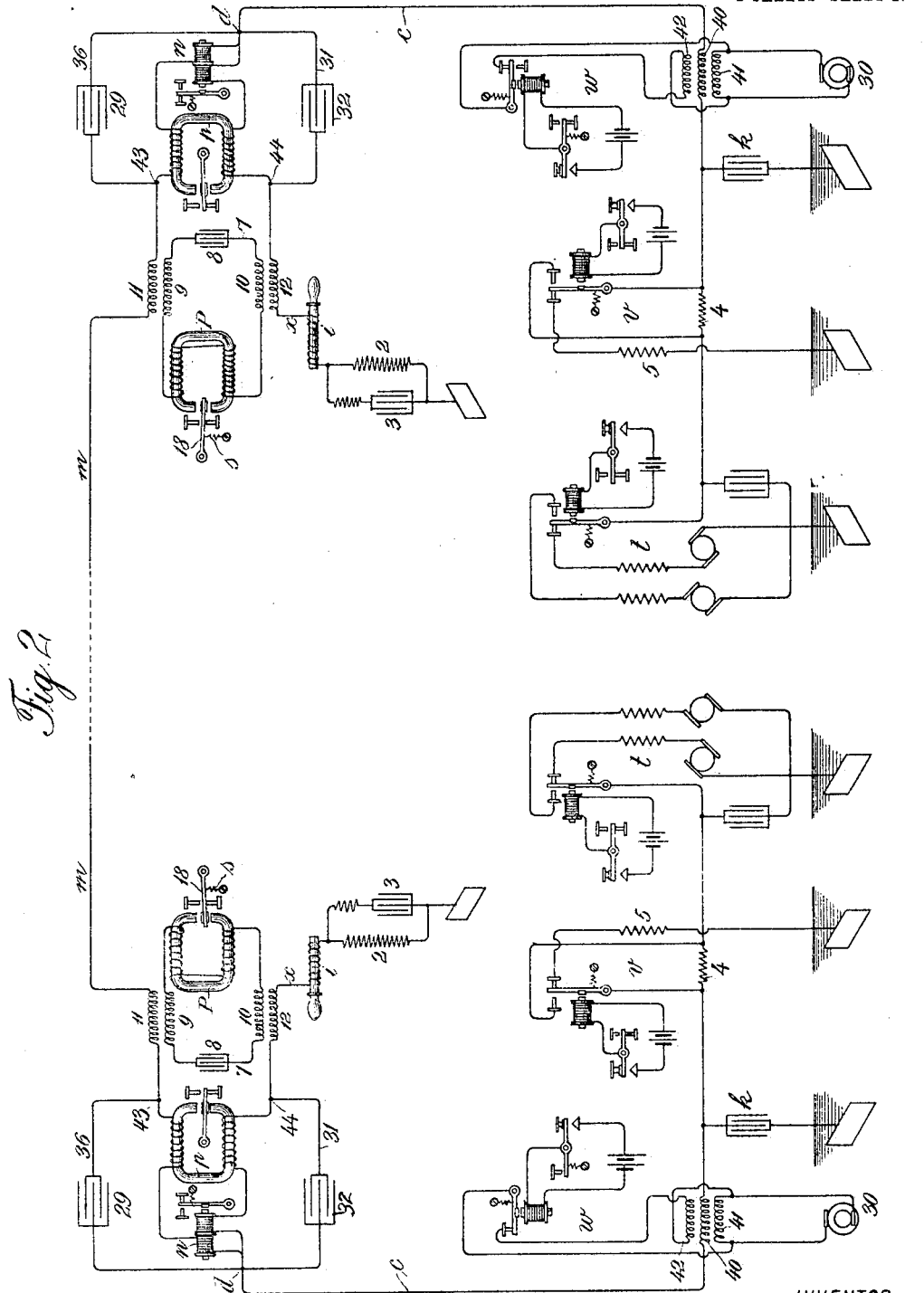

UNITED STATES PATENT OFFICE.

STERNS F. JONES, OF NEW YORK, N. Y., ASSIGNOR OF ONE-HALF TO POSTAL TELEGRAPH-CABLE COMPANY, OF NEW YORK, N. Y., A CORPORATION OF NEW YORK.

SEXTUPLEX TELEGRAPHY.

No. 799,238.     Specification of Letters Patent.     Patented Sept. 12, 1905.

Application filed April 7, 1905. Serial No. 254,421.

*To all whom it may concern:*

Be it known that I, STERNS F. JONES, a citizen of the United States, residing in the borough of Brooklyn, in the city of New York, county of Kings, State of New York, have made certain new and useful Improvements in Sextuplex Telegraphy, of which the following is a specification.

My invention relates to that form of multiplex telegraphy in which three messages are simultaneously sent and three more simultaneously received at a terminal station.

The object of my invention is to increase the capacity of a telegraph-line.

I provide at each terminal station a neutral relay and two polarized relays. I prefer to wind these relays differentially and include one coil in the natural line and one coil in the artificial line. In the transmitter branch I connect a polarity-changing transmitter controlling one or more suitably-arranged generators. I also provide a current-changing transmitter—that is, one that varies the strength of the current—and I provide a third transmitter controlling a source of short, rapidly-recurring impulses of electricity—say four hundred per second. The relays are balanced either by the differential method or in any other suitable manner. The artificial line is given the same electrical characteristics possessed by the natural line. The transmitting devices in the transmitter branch each throws its characteristic current or inflection of current upon the main line, and the home relays are neutral or irresponsive to any and all such impulses. This apparatus is duplicated at each of two terminal stations. The second polar relay, designed to respond to the rapid alternations divided into groups to represent a code as distinguished from continuous currents coterminus with an elemental part of a signal to which the other two relays respond, is included in a separate circuit, its coils in series with the condenser. I provide four transformer-coils, arranged in pairs. One coil of each pair is in series in the separate circuit with the relay, the other coil of which pair is in the main line and artificial line, respectively. I place an inductance in the artificial line, together with a resistance and a capacity to enable me to introduce the electrical and electromagnetic conditions characteristic of the main line. I connect a branch circuit, containing a condenser, from the point of connection of the transmitter branch to a point between the polarized relays in the main line and connect a second similar branch from the first-named point to a point in the artificial line between said polar relays.

The accompanying drawings illustrate my invention.

Figure 1 shows the apparatus at one end of the line on an enlarged scale. Fig. 2 shows duplicate apparatus at both ends of the line electrically connected to a single circuit.

The apparatus shown at one terminal station appears at the distant terminal station in duplicate.

$m$ is the main line.

$x$ is the artificial line.

$c$ is the transmitter branch, in which is included a pole-changing transmitter $t$. This transmitter operates to connect either of the generators shown, which have opposite poles grounded and opposite poles connected to line and to direct upon the line a continuous-current impulse coterminus with the element of a signal, such as a dot or a dash.

$v$ is an ampere-changing transmitter—that is, it changes the current strength by introducing a resistance 4 in the transmitter branch $c$ in one position and connecting a leak branch 5, while in the other position it disconnects the leak branch 5 and cuts out the resistance 4, all as shown and described in a patent issued to Stephen D. Field, July 5, 1881, No. 243,698, the arrangement being known as the "Field shunt and leak transmitter."

$w$ is a simple transmitting device controlling a source of short rapidly-recurring current impulses.

30 is an alternating-current generator developing about four hundred cycles per second. It is connected with a transformer having three coils or coil-windings. The winding 40 is included in the transmitter branch $c$. The winding 41 is connected to the source 30. The winding 42 is connected to the break-points of the transmitter $w$ in such a manner that the operation of the transmitter $w$ operates to connect the coil 42 in circuit with the source 30 and neutralizes the effect of the coil 41 in its inductive action on the coil 40, and in the other position of the transmitter $w$ the coil 42 is on open circuit and the inductive action of the coil 41 on coil 40 is at its maximum. All these transmitting devices are in the transmitting branch $c$, connected to the junction $d$ between the main line $m$ and the artificial line $x$.

$n$ is a neutral relay differentially wound with a coil in the main line and a coil in the artificial line.

$p$ is an ordinary form of polarized relay differentially wound, having a coil in each line.

P is a polarized relay having an armature 18 with a retracting device $s$, usually in the form of a spring. I adjust this relay so that it has no bias, or substantially none, and hold the armature 18 upon the closing-point of a local circuit containing a repeating-sounder, which in turn operates a local circuit with a reading-sounder constituting the "bug-trap" arrangement, as is well known. The relay P has its coils included in a separate circuit 7. In series with said coil in circuit 7 is a condenser 8. I provide four transformer-coils 9, 11, 10, and 12. They are arranged in pairs. 9 and 10 are included in the circuit 7. 11 is in the main line $m$ and 12 in the artificial line $x$.

I provide an inductance $i$, a resistance 2, and a condenser 3 for the artificial line $x$, to give it the same electrical characteristics possessed by the line $m$. I connect a separate branch circuit 36 from the point $d$ to the point 43 in the line $m$ between the two polarized relays. There is a condenser 29 in the branch 36. 31 is a similar branch connecting the point $d$ to a point 44 in the artificial line $x$ between the two polarized relays. There is a condenser 32 in the branch 31.

Continuous-current impulses from the transmitters $t$ and $v$ are ineffective in the coils of the home relays, and the same is true of impulses from the transmitter $w$; but the relay P responds to the short rapid alternations from the transmitter $w$ at the distant station, these impulses finding a free and unobstructed path around the relays $n$ and $p$ through the branch 36 to the ground, and through the condenser $k$ in the branch circuit connecting the condenser with the transmitter branch $c$ and the ground. These impulses act inductively upon the separate circuit 7, through the induction-coils 9 and 11, while outgoing impulses from a similar transmitter at the home station act inductively and oppositely in the circuit 7, through the transformer-coils 9 and 11 on one side and 10 and 12 on the other. Reversals in polarity of a continuous current from the transmitter $t$ at the distant station do not affect the relay P, but cause the relay $p$ to respond, the relay $n$ being neutral and unaffected in a manner well understood. When the transmitter $v$ at the distant station is operated, the relay $n$ responds by reason of the increased current strength of either polarity. I am thus enabled to transmit three separate and distinct sets of signals on the relays P, $p$, and $n$ by the simultaneous operation of three transmitters located in the transmitting branch at the distant station, constructed, arranged, and operated like the transmitters $t$, $v$, and $w$.

What I claim, and desire to secure by Letters Patent, is—

1. The combination with a telegraph-line of a sextuplex arrangement of apparatus consisting of three relays, one or more of which are polarized, an associated transmitting system including a pole-changing transmitter, an ampere-changing transmitter and a transmitter controlling a source of short and rapid alternating-current impulses, means whereby outgoing signals are rendered neutral upon the home-relay system; a separate circuit for one relay and means for inductively connecting said relay with said main and artificial lines.

2. The combination with a telegraph-line of a sextuplex arrangement of apparatus consisting of a neutral relay and two polarized relays, an associated transmitting system including a pole-changing transmitter, an ampere-changing transmitter and a transmitter controlling a source of short and rapid alternating-current impulses, means whereby outgoing signals are rendered neutral upon the home-relay system; a separate circuit for the second polar relay and means for inductively connecting said circuit with the main and artificial lines, respectively.

3. The combination with a telegraph-line of means for transmitting and receiving three sets of signals in the same direction simultaneously consisting, at the receiving-station, of three relays, one or more of which are polarized, an artificial line, a separate circuit containing the coils of one relay, means for inductively connecting said circuit with said main and artificial lines; and at a transmitting-station a pole-changing transmitter, an ampere-changing transmitter and a transmitter controlling a source of short, and rapid current alternations.

4. The combination with a telegraph-line of a sextuplex arrangement of apparatus at each station, consisting at each station of three relays, one of said relays being neutral and one or more polarized, said neutral relay and one polar relay having two coils each, a transmitter branch containing a pole-changing transmitter, an ampere-changing transmitter and a transmitter controlling an independent source of short and rapid alternating-current impulses, an artificial line having substantially the same electrical characteristics possessed by the natural line, a coil of said neutral relay and a coil of one polar relay in the main line, the second coils of said relays in the artificial line; a separate circuit containing the coils of the third relay and means for inductively connecting said circuit with the main and artificial lines.

5. The combination with a telegraph-line of a sextuplex arrangement of apparatus at each station, consisting of a neutral relay and two other relays, one or both of which are polarized, differential coils on said neutral and one of said polar relays; an associated transmitting system including a pole-changing transmitter, an ampere-changing transmitter and a transmitter controlling an independent source of short and rapid alternating-current impulses, an artificial line having substantially the same electrical characteristics possessed by the natural line, a coil of said differential relays included in the main line, the second coils of said relays included in the artificial line and a separate circuit containing the coils of the third relay, a condenser in said circuit in series therewith and means for inductively connecting said circuit with the main and artificial lines, respectively.

6. The combination with a telegraph-line of a sextuplex arrangement of apparatus at one station, consisting of three relays, one of said relays being neutral and one or more polarized, differential coils for said neutral, and one polar relay; a transmitter branch containing a pole-changing transmitter, an ampere-changing transmitter and a transmitter controlling an independent source of short and rapid alternating-current impulses, an artificial line having substantially the same electrical characteristics possessed by the natural line, one coil of each of said differential relays in the main line, the second coils of said relays in the artificial line and a separate circuit including the coil of said third relay, a condenser in series with said coil, and means for inductively connecting said circuit with the main and artificial lines, respectively, consisting of a transformer in the main line, a transformer in the artificial line, the second coil of each of said transformers being in said separate circuit.

7. The combination with a telegraph-line of a sextuplex arrangement of apparatus at one station, consisting of three relays, one of said relays being neutral and one or more polarized, differential coils for the neutral relay and one polar relay; an associated transmitting system including a pole-changing transmitter, an ampere-changing transmitter and a transmitter controlling an independent source of short and rapid alternating-current impulses, an artificial line having substantially the same characteristics possessed by the natural line, a coil of said neutral relay and a coil of a polar relay in the main line, the second coils of said relays being in the artificial line, a separate circuit containing the coil of the third relay, a condenser in series with said coil and four transformer-coils arranged in pairs, two coils being in said separate circuit, one coil in the main line and one coil in the artificial line, substantially as described.

8. The combination with a telegraph-line of a sextuplex arrangement of apparatus at one station, consisting of three relays, including one neutral relay and one polar relay; a pole-changing transmitter, an ampere-changing transmitter and a transmitter controlling a source of short, rapid current impulses, an artificial line and means for connecting said transmitters to said relays in such a manner that outgoing signals are balanced on the home relays, a branch circuit extending between points in the line including the continuous-current relays, and a second branch extending from the first-named point to a point in the artificial line including said relays.

9. The combination with a telegraph-line of a sextuplex arrangement of apparatus at one station, consisting of three relays, including one neutral and one polarized relay; a pole-changing transmitter, an ampere-changing transmitter and a transmitter controlling a source of short, rapid alternating-current impulses, an artificial line and means for connecting said transmitters to said relays in such a manner that outgoing signals are balanced on the home relays, and branch circuits containing a condenser bridging said neutral relay and the continuous-current polar relay in both the main line and artificial line.

10. The combination with a telegraph-line of means for transmitting and receiving two sets of signals in the same direction simultaneously, consisting of two relays, an associated transmitting system including a transmitter controlling continuous currents and a transmitter controlling alternating currents, means whereby outgoing signals are rendered neutral upon the home-relay system including an artificial line, a separate circuit for one relay and means for inductively connecting said relay with said main and artificial lines.

11. The combination with a telegraph-line of means for transmitting and receiving two sets of signals in the same direction simultaneously, consisting of two relays, an associated transmitting system including a transmitter controlling continuous currents and a transmitter controlling alternating currents, means whereby outgoing signals are rendered neutral upon the home-relay system including an artificial line, a separate circuit for one relay and two transformers each having a coil in said separate circuit, a coil in the main line and a coil in the artificial line.

12. The combination with a telegraph-line of means for transmitting and receiving two sets of signals in the same direction simultaneously, consisting of two polarized relays, an associated transmitting system including a transmitter controlling continuous currents and a transmitter controlling alternating currents, means whereby outgoing signals are rendered neutral upon the home-relay system including an artificial line, a separate circuit for one relay and means for inductively connecting said relay with said main and artificial lines.

STERNS F. JONES.

Witnesses:
HENRY G. FRITSCHE,
A. M. DONLEVY.